Feb. 15, 1944.       W. O. KINNEBREW        2,342,053
                      BULK FRUIT WEIGHER
              Filed Sept. 23, 1942      3 Sheets-Sheet 1

INVENTOR:
WILLIAM O. KINNEBREW

ATTORNEY

Feb. 15, 1944. W. O. KINNEBREW 2,342,053
BULK FRUIT WEIGHER
Filed Sept. 23, 1942 3 Sheets-Sheet 2

INVENTOR:
WILLIAM O. KINNEBREW
BY
ATTORNEY

Feb. 15, 1944. W. O. KINNEBREW 2,342,053
BULK FRUIT WEIGHER
Filed Sept. 23, 1942 3 Sheets-Sheet 3
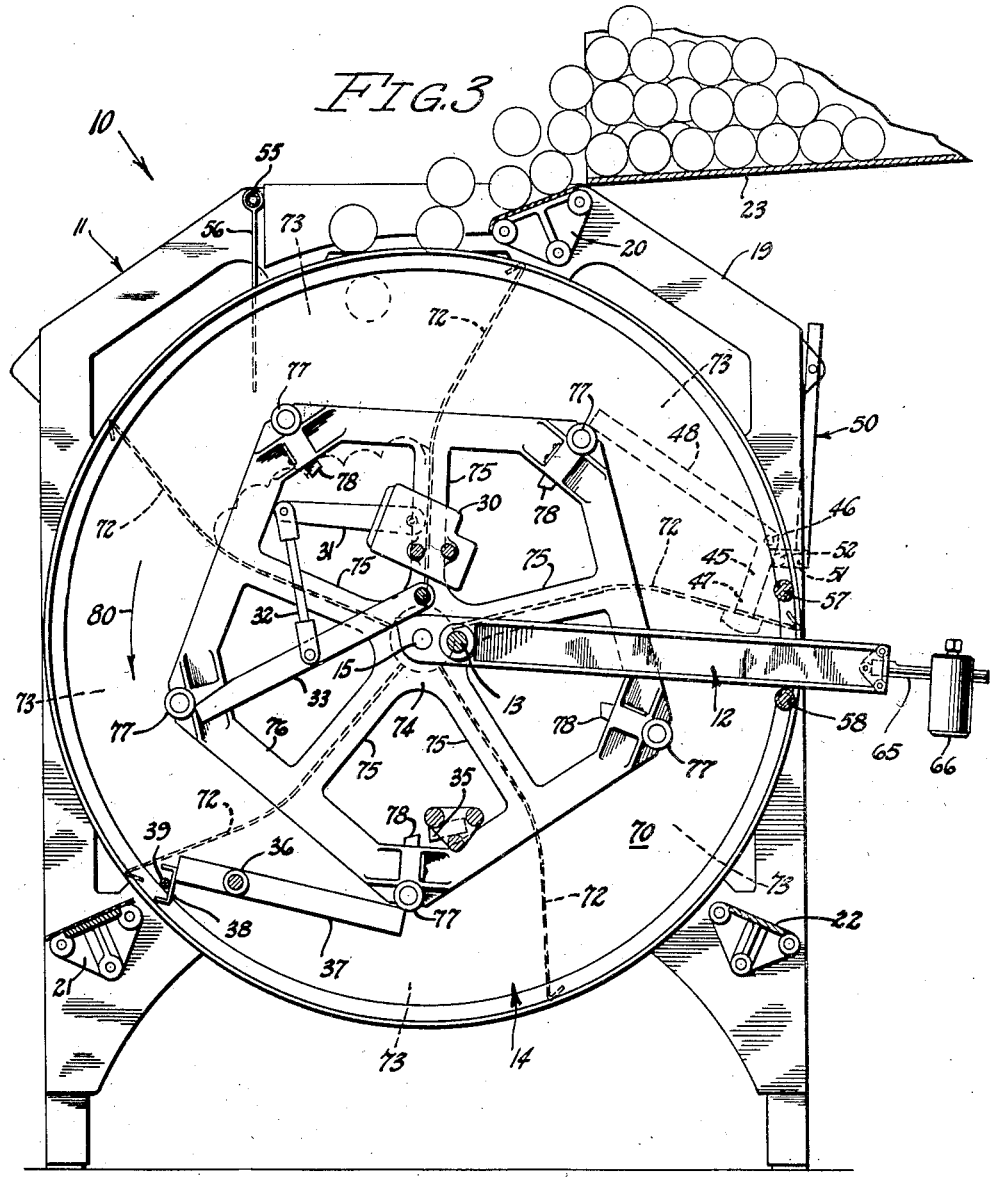
FIG.3
INVENTOR:
WILLIAM O. KINNEBREW
ATTORNEY Patented Feb. 15, 1944

2,342,053

UNITED STATES PATENT OFFICE 2,342,053

BULK FRUIT WEIGHER

William O. Kinnebrew, Winter Haven, Fla., assignor to Food Machinery Corporation, San Jose, Calif., a corporation of Delaware Application September 23, 1942, Serial No. 459,364

2 Claims. (Cl. 249—19)

This invention relates to automatic weighers and is particularly useful in the handling of loose fruit. For illustrative purposes it will, therefore, be described herein as when used in this connection.

It is an object of the invention to provide an improved bulk fruit weigher for handling relatively large volumes of fruit with a relatively high degree of accuracy.

The manner of accomplishing the foregoing object, as well as further objects and advantages, will be made manifest in the following description taken in connection with the accompanying drawings in which Fig. 1 is a side elevational view of a preferred embodiment of the invention.

Fig. 3 is a diagrammatic, operational, sectional view taken on the line 3—3 of Fig. 2 and showing the parts of the device as positioned at a different moment in the operation thereof than is illustrated in Figs. 1 and 2.

Figure 1:
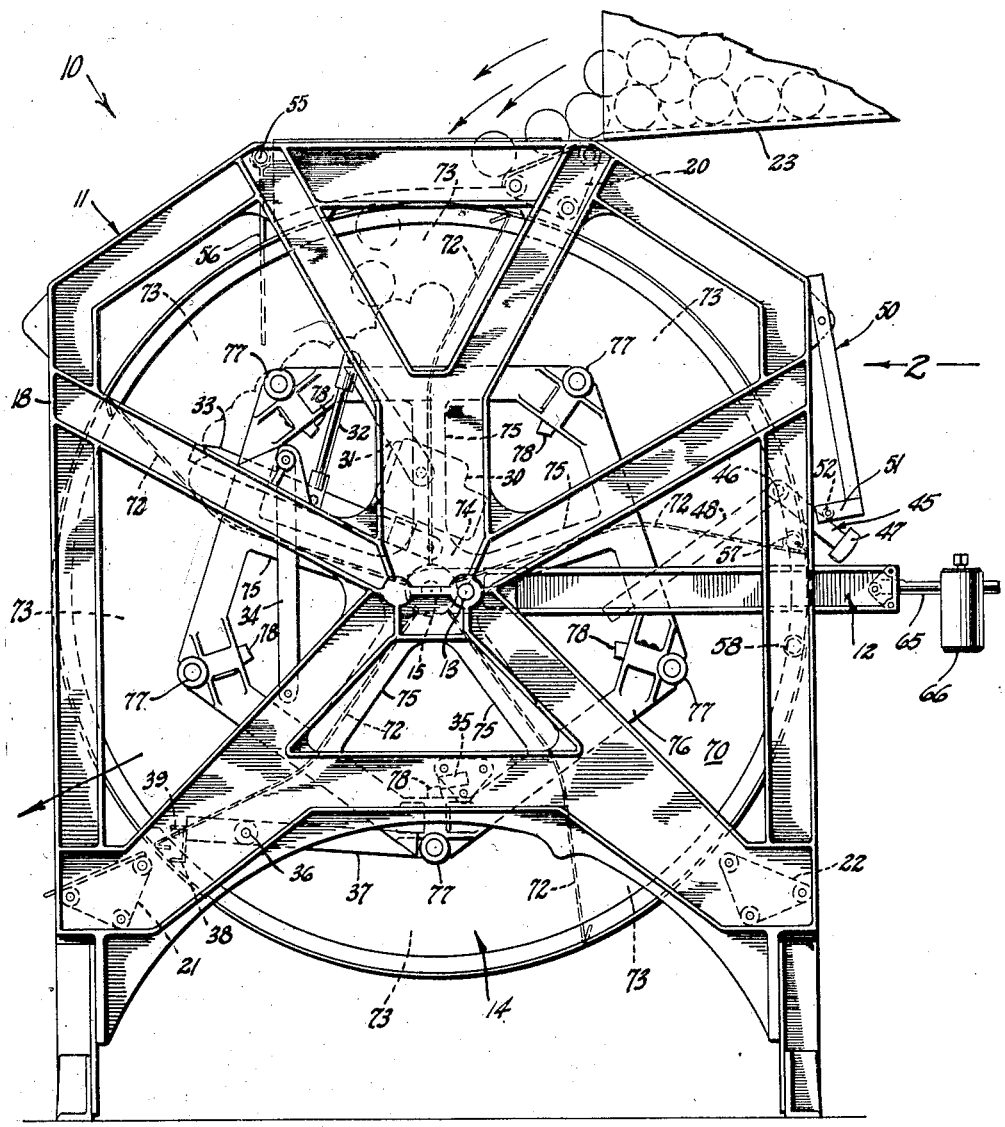
Figure 2:
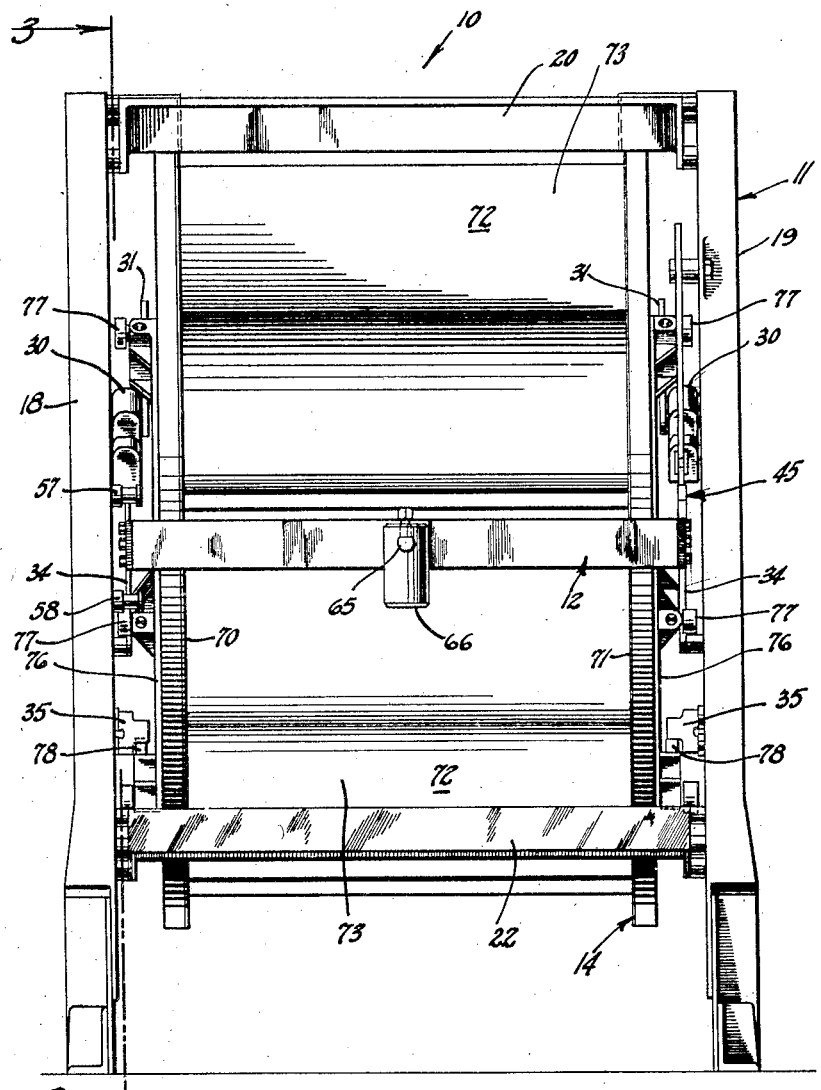
Fig. 2 is an end elevation of Fig. 1 taken in the direction of the arrow 2.

Referring specifically to the drawings, the bulk fruit weigher 10 disposed therein includes a frame 11, a U-shaped scale beam 12 pivotally mounted thereon on trunnions 13; a weighing bin rotor 14 rotatively mounted on beam 12 on trunnions 15 and a number of control devices associated with the frame, scale beam, and rotor aforesaid, to produce automatic operation of the weigher 10.

The frame 11 includes a pair of spider-like side standards 18 and 19 which are substantial duplicates of each other and are preferably formed by casting. These standards are rigidly connected together in spaced relationship by plates 20, 21, and 22. The plates 20 and 21 provide incoming and outgoing transfer boards for fruit entering and leaving the machine 10. A conveyor or chute 23 may be provided to deliver fruit to the transfer board 20 and any suitable means (not shown) may be placed to receive fruit discharged from the machine over the transfer board 21.

Mounted on the inner face of each of the frame standards 18 and 19 is a shock absorber 30 having an arm 31 connected by a link 32 to a rotor retarding lever 33. Also mounted on the inner faces of standards 18 and 19 are bars 34 for guiding the levers 33 during operation of the latter in a manner and for a purpose to be made clear hereinafter.

Mounted on the inner face of each of the standards 18 and 19 is a vertically adjustable stop shoulder 35.

Pivotally mounted on pins 36, provided on the inner faces of standards 18 and 19 are reverse stop levers 37, each of which has a counterweight 38. The degree of movement of each lever 37 is limited by a stop pin 39 provided on the frame standards 18 and 19.

The frame standard 19 has pivotally mounted thereon a beam snubber 45 which is in the form of a bell crank pivoted on a pin 46 and having a beam engaging arm 47 and a pin engaging arm 48.

Also pivoted on the standard 19 is a snubber limit lever 50 having an inwardly extending fork 51 containing a roller 52 which engages the arm 47 of the snubber 45 so as to limit the outward swinging of this arm, as will be made clear hereinafter.

Supported on a bar 55 extending across the frame 11 is a heavy curtain 56, the purpose of which will be made clear hereinafter.

Extending inwardly from frame standard 18 are upper and lower beam limit stops 57 and 58.

Scale beam 12 is U-shaped and carries a graduated scale arm 65 on which a weight 66 is slidably adjustable. As before stated, the scale beam 12 has trunnions 13 which bear in suitable apertures provided therefor in the frame 11. Swinging movement of the beam 12 about these trunnions is limited by the pins 57 and 58. The beam engaging arm 47 lies in the same plane as an adjacent portion of the scale beam 12 so that when the bell crank 45 is swung to extend this arm downward (see Fig. 3) the beam 12 is forced down almost into contact with the stop 58.

Mounted as aforestated on trunnions 15 between the inner ends of the U-shaped scale beam 12, the rotor 14 includes two circular end walls 70 and 71. The space within these walls is divided by partitions 72 into five bins 73 of equal size.

Each end wall 70, 71 has a hub 74 from which spokes 75 extend outwardly to a pentagonal rim 76 carrying at its apices laterally extending rollers 77 and inwardly extending stop dogs 78.

There are five sets of rollers 77 and dogs 78 at each end of the rotor 14.

Operation

A stream of fruit is fed more or less constantly from the bin 23 over the transfer board 20 into a bin 73 disposed to receive this fruit. When the delivery of this fruit commences, the beam 12 is down as shown in Fig. 3 and the delivery of fruit continues until a sufficient quantity of fruit is present in this bin to lift the beam 12 and counterweight 66 provided thereon to a point where the rotor 14 will be lowered sufficiently to disengage the lowermost pair of dogs 78 thereon from the pair of shoulders 35 provided on the frame standards 18 and 19.

Fig. 1 illustrates the situation which exists just as soon as enough fruit has been received by the aforesaid bin 73 to swing the beam 12 upwardly. Instantly upon the freeing of the lowermost pair of dogs 78 from engagement with shoulders 35, the rotor 14 starts rotating in the direction of arrow 80 in Fig. 3. This rotation brings a pair of the rollers 77 into engagement with the levers 33, and actuates the shock absorbers 30. Bars 34 guide the levers 33 while the latter are yielding in front of the rollers 77 so as to maintain these levers aligned with said rollers. These function to decelerate the rotation of the rotor 14 as the lower partition 72 of the bin filled with fruit approaches the transfer board 21.

At the same time this is taking place another roller 77 rises from below and engages the arm 48 of the bell crank 45, swinging the arm 47 into engagement with the beam 12 and depressing this as shown in Fig. 3. The purpose and effect of this action is to insure that when the rotor 14 has made ⅕ of a single revolution a pair of the dogs 78 will engage the shoulders 35 and halt further rotation of the rotor 14, thereby conditioning the latter to begin another weighing operation.

Engagement of a pair of rollers 77 with the snubber levers 33 and engagement of another of the rollers 77 with the arm 48 of the bell crank 45 is such that these rollers disengage these levers and this arm just before the lowermost pair of dogs 78 engage the stop shoulders 35. Fig. 3 illustrates the situation just before this disengagement takes place.

As soon, of course, as the levers 33 are disengaged, the snubbers 30 retract these back to the position in which they are seen in Fig. 1. In a similar manner, the bell crank 45 resumes the position in which it is shown in Fig. 1 as soon as the roller 77 which had actuated this bell crank has moved out of contact with the arm 48 thereof.

The snubber limit lever 59 merely serves to prevent excessive swinging of the bell crank 45 when a roller 77 engaging the arm 48 moves out of contact therewith.

The reverse check levers 37 yield downwardly to permit the lowermost rollers 77 to ride over these as shown in Fig. 3. As soon as this pair of rollers passes beyond the ends of these levers the latter are lifted by their counterweights 38 into the positions in which one of these is shown in Fig. 1, so as to prevent a rebound of the rotor 14 resulting from a pair of dogs 78 striking the fixed shoulders 35.

The curtain 56 merely acts to prevent fruit from bounding out of a bin 73 when the latter is receiving fruit.

At the conclusion of each weighing operation as above described, another weighing operation is started, this automatic functioning of the machine continuing as long as fruit is delivered thereto by the chute 23.

A suitable counter (not shown) is positioned on the frame 11 to be engaged by each of the rollers 77 on that side, thereby registering the exact number of completed weighing operations performed by the machine.

To keep a check on the accuracy of the machine 10, a single load of fruit weighed thereby is, at regular intervals, isolated and weighed. Where the average weight of these check loads deviates from the desired poundage an adjustment is made of the weight 66 on the graduated scale arm 65 to effect the necessary correction.

What I claim is:

1. In an automatic bulk weigher the combination of: a frame; a scale beam; fulcrum means on said frame supporting said beam; a rotor supported on said beam on one side of said fulcrum; counterweight means supported on said beam on the other side of said fulcrum; means forming a series of weighing bins in said rotor; a series of control means on said rotor, said control means being equal in number to said bins and correspondingly spaced apart on said rotor; shoulder means on said frame which is adapted to be engaged by one of said control means when said rotor is unloaded and said beam correspondingly tilted to elevate said rotor and is adapted to be disengaged by said particular control means when a sufficient amount of bulk material is delivered to said rotor to overbalance said counterweight and tilt said beam to lower said rotor; and means operable by one of said control means when said shoulder means has been disengaged as aforesaid by one of said control means, to tilt the scale beam to again elevate said rotor while it is rotating and cause said shoulder means to be engaged by one of said control means to halt said rotor in the proper position for receiving another load of material.

2. A combination as in claim 1 in which said scale beam tilting means embodies means for positively retaining said rotor in elevated position until after its rotation has been halted by engagement of one of said control means.

WILLIAM O. KINNEBREW.